(12) United States Patent
Brown et al.

(10) Patent No.: US 8,547,847 B2
(45) Date of Patent: Oct. 1, 2013

(54) TRANSPARENT QUALITY OF SERVICE (75) Inventors: Patrick G. Brown, Hillsborough, NC (US); Michael J. Cadigan, Jr., Poughkeepsie, NY (US); Thomas D. Moore, Raleigh, NC (US); Bruce H. Ratcliff, Red Hook, NY (US); Jerry W. Stevens, Raleigh, NC (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 12/841,673

(22) Filed: Jul. 22, 2010

(65) Prior Publication Data
US 2012/0020214 A1   Jan. 26, 2012

(51) Int. Cl.
*G06F 11/00* (2006.01)
(52) U.S. Cl.
USPC .......................................................... 370/236

(58) Field of Classification Search
USPC ...... 370/236, 329; 709/229, 224; 379/88.18; 345/619
See application file for complete search history.

(56) References Cited

U.S. PATENT DOCUMENTS

| | | | |
|---|---|---|---|
| 6,708,218 B1 | 3/2004 | Ellington, Jr. et al. | |
| 7,039,048 B1 | 5/2006 | Monta et al. | |
| 7,336,661 B2 * | 2/2008 | Makela et al. | 370/395.1 |
| 7,733,872 B2 | 6/2010 | Hewett et al. | |
| 7,742,482 B1 | 6/2010 | Aggarwal | |

* cited by examiner

*Primary Examiner* — Chandrahas Patel
(74) *Attorney, Agent, or Firm* — Cantor Colburn LLP; Steven Chiu (57) ABSTRACT

A method, computer program product, and device are provided for transparent separation of traffic. A communication interface is configured to transmit and receive traffic over a network. A stack is configured to dynamically identify the traffic as interactive traffic and non-interactive traffic. When the stack identifies the non-interactive traffic, the stack is configured to move the non-interactive traffic to a non-interactive queue.

17 Claims, 6 Drawing Sheets

TRANSPARENT QUALITY OF SERVICE

BACKGROUND

Exemplary embodiments relate to communications, and more specifically, to a transparent quality of service for communications.

With so much traffic being received over the Internet, all communication traffic is not same. Because of the type of traffic, some traffic is more affected by latency issues than other types of traffic. Traffic that is affected by latency issues can be delayed or blocked by traffic not affected by latency issues and the requirement to optimize for one type of traffic may adversely affect the other type of traffic.

BRIEF SUMMARY

According to exemplary embodiments, a device is provided for transparent separation of traffic. A communication interface is configured to transmit and receive traffic over a network. A stack is configured to dynamically identify the traffic as interactive traffic and non-interactive traffic. When the stack identifies the non-interactive traffic, the stack is configured to move the non-interactive traffic to a non-interactive queue.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Exemplary embodiments provide a mechanism to optimize for inbound latency sensitive interactive traffic, specific inbound blocking, and inbound interrupt.

This concept applies to computer (e.g., server) environments in which a single TCP/IP (network) interface can handle data streams for many different workload types. For this disclosure, examples may be provided utilizing two types of traffic for the sake of illustrating the use of exemplary embodiments, but exemplary embodiments are not limited to these two types of traffic. One type of traffic is interactive traffic such as packets for an online transaction processing (OLTP) application, and the other type of traffic is non-interactive traffic such as packets for bulk data streaming, e.g., using file transfer protocol (FTP).

For interactive traffic that requires a response to a request to continue receiving packets of the interactive traffic, OLTP applications are often used to capture new data or update existing data. An order-entry system is a typical example of an OLTP application. OLTP applications have the following characteristics: transactions that involve small amounts of data, indexed access to data, many users, frequent queries and updates, and fast response times. The interactive traffic of OLTP refers to a class of systems that facilitate and manage transaction-oriented applications, typically for data entry and retrieval transaction processing. OLTP has also been used to refer to processing in which the system responds immediately to user requests. An automatic teller machine (ATM) for a bank is an example of such a commercial transaction processing application. The technology is used in a number of industries, including banking, airlines, mail order, supermarkets, and manufacturing. Applications include electronic banking, order processing, employee time clock systems, e-commerce, and eTrading.

For non-interactive traffic that does not require responses to requests to receive packets but where the packets of interactive traffic are sent in bulk, file transfer protocol (FTP) is a protocol for exchanging bulk type files over the Internet. FTP works in the same way as hypertext transfer protocol (HTTP) for transferring Web pages from a server to a user's browser and simple mail transfer protocol (SMTP) for transferring electronic mail across the Internet in that, like these technologies, FTP uses the Internet's TCP/IP protocols to enable data transfer. FTP is most commonly used to download a file from a server using the Internet or to upload a file to a server (e.g., uploading a Web page file to a server).

When running multiple types of workloads which include non-interactive (streaming) and interactive traffic types to a single TCP/IP stack, processing the streaming traffic on the same processor as interactive traffic can nullify or severely degrade the response times of the latency sensitive interactive traffic. In general, optimizing processing for one type of workload will cause degradation to the other workload types. Streaming workloads involve bulk data traffic and are throughput sensitive, where as interactive workloads are latency sensitive and involve small amounts of data. Exemplary embodiments (e.g., a software component 135 which will be discussed below with reference to FIG. 1) transparently identify the type of data stream, dynamically separate the bulk data (streaming) non-interactive traffic (from the interactive traffic), and schedule a new process to run on a separate computer processor unit (CPU) to handle the bulk data non-interactive traffic. This separation enables the bulk data traffic to have its own inbound blocking and interrupt optimizations independent of the interactive traffic's optimizations, enabling both workloads to run in their most efficient manner. With this method of exemplary embodiments, the inbound blocking and interrupt processing can be tailored for each traffic type.

Figure 1:
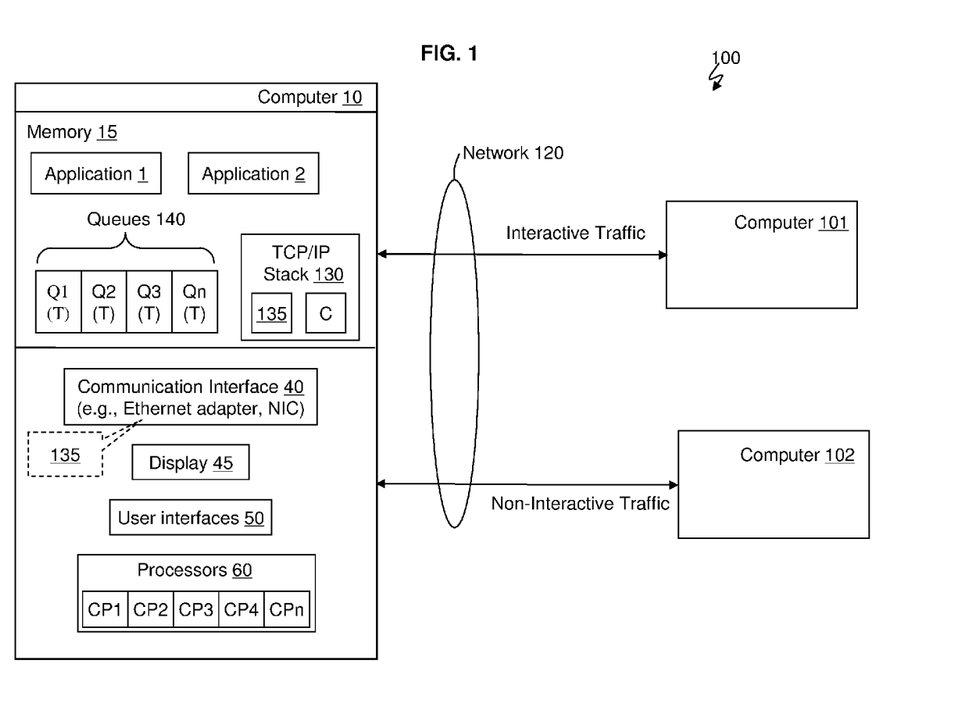
FIG. 1 illustrates a block diagram in accordance with exemplary embodiments.

Now turning to FIG. 1, FIG. 1 illustrates a block diagram 100 of a topology in accordance with exemplary embodiments.

The diagram 100 depicts a computer 10 which may be one or more servers or any type of computing device, and the computer 10 is operatively connected to computers 101 and 102 over a network 120. The computer 10 may include and/or be coupled to memory 15, a communication interface 40, a display 45, user interfaces 50, and processors 60. The communication interface 40 comprises hardware (including processors or microprocessors) and software for communicating over the network 120 such as Ethernet adapters, network interface cards (NIC), wireless adapters, network adapter, modems, and other circuitry. The user interfaces 50 may include, e.g., a track ball, mouse, pointing device, keyboard, touch screen, etc, for interacting with the computer 10, such as inputting information, making selections, etc. Similarly, the computers 101 and 102 may include and/or be coupled to their own memory 15, communication interface 40, display 45, user interfaces 50, and processors 60 (which are not shown for simplicity).

The computer 10 includes memory 15 which may be a computer readable storage medium. One or more software applications such as an application 1 (representing an interactive application), an application 2 (representing a non-interactive application), and a TCP/IP stack 130. The applications 1 and 2 and the TCP/IP stack 130 may reside on or be coupled to the memory 15, and each software application comprises logic and software components (in the form of computer executable instructions) to operate and function in accordance with exemplary embodiments. Although the software applications (application 1, application 2, and TCP/IP stack 130) are each shown as a single element in FIG. 1 for conciseness, the application 1, application 2, and TCP/IP stack 130 may represent numerous software components (or modules) according to exemplary embodiments.

The TCP/IP stack 130 is configured as Internet Protocol suite of a set of communication protocols used for the Internet and other similar networks. The TCP/IP stack 130 is named from two of the most notable protocols in it: the Transmission Control Protocol (TCP) and the Internet Protocol (IP), which were the first two networking protocols defined in this standard. The Internet Protocol suite, like many protocol suites, is constructed as a set of layers. Each layer solves a set of problems involving the transmission of data. In particular, the layers define the operational scope of the protocols within. Often a component of a layer provides well-defined services to the upper layer protocols and may be using services from the lower layers. Upper layers are logically closer to the user and deal with more abstract data, relying on lower layer protocols to translate data into forms that can eventually be physically transmitted. The TCP/IP model consists of four layers, which may be defined differently or called by different names. From lowest to highest, these are the link layer, the Internet layer, the transport layer, and the application layer. One skilled in the art understands TCP/IP protocols and the software applications the implement the same.

In accordance with exemplary embodiments, the TCP/IP stack 130 also includes modifications which are represented as software components 135 that are configured to detect and implement processes for different types of traffic such as interactive traffic and non-interactive traffic.

The software component 135 of the TCP/IP stack 130 is configured to transparently detect and determine streaming behavior of non-interactive traffic as opposed to interactive traffic. The software component 135 is configured to direct (place) the interactive traffic and non-interactive traffic in different queues 140 of the computer 10 based on the traffic type.

Initially, the software component 135 of the TCP/IP stack 130 may place all inbound traffic on Qn (which is the default queue) of the queues 140, and at the outset, the Qn may include both interactive traffic and non-interactive traffic. As the interactive traffic is being received at the TCP/IP stack 130 via the communication interface 40 and being placed in the Qn queue of the queues 140, the software component 135 (subsequently) determines that non-interactive traffic is being placed on the Qn too. When the software component 135 of the TCP/IP stack 130 determines that non-interactive traffic is flowing through the communication interface 40 and being placed on the Qn, the software component 135 is configured to register (and create) a new queue (which is Q1) for this non-interactive traffic. The software module 135 of the TCP/IP stack 130 dynamically registers, e.g., Q1 of queues 140 to receive the non-interactive traffic which is bulk streaming data packets. The Q1 is configured not to be registered (created) in advance by the software component 135 so as not to consume memory 15 resources when the non-interactive traffic is not being received by the TCP/IP stack 130 via the communication interface 40. For example, the software component 135 is configured, e.g., to monitor the socket connection for application 1 receiving interactive traffic and monitor the socket connection for application 2 receiving non-interactive traffic. When the software component 135 determines that non-interactive traffic is flowing on the socket connection for application 2, the software component 135 is configured to register Q1 via the 5 tuples of the non-interactive data packets. The 5-tuple registration of the application 2 socket connection to Q1 for the non-interactive traffic comprises: source IP address, destination IP address, source port number, destination port number, and protocol (TCP/UDP). The routing variables are sent from the TCP/IP stack 130 to the adapter 40 (e.g., open systems adapter (OSA)), so that the non-interactive traffic is passed to the Q1 via the TCP/IP stack 130. When the software component 135 determines that the non-interactive traffic for the application 2 is finished, the software component 135 deregisters the Q1. For further information regarding registration and deregistration of queues and routing variables, please refer to patent application Ser. No. 12/640,832 entitled "DIRECT MEMORY ACCESS WITH MINIMAL HOST INTERRUPTION" filed on Dec. 17, 2009, which is herein incorporated by reference in its entirety.

In one implementation, Qn is initially the only existing queue 140, and all other queues 140 are (subsequently) registered (created) as needed by the software component 135, i.e., the software component 135 is configured to register (create) Q1 at the time that the non-interactive traffic is determined to be flowing on the TCP/IP stack 130 by the software component 135. Also, note that the 5 tuple is only one example of identifying and/or categorizing different traffic types which can be moved to other queues, but is not meant to be limiting.

The software module 135 registers (configures) Q1 to have a different interrupt time (represented as timer "T") and block hold times than the default Qn of the queues 140. When each queue 140 is registered (created) by the software component 135, the software component 135 also sets the timer (T) so that the each queue 140 is configured interrupt its corresponding application at the appropriate time. As an example, the application 1 (e.g., the OLTP application) may be communicating with the computer 101 via a socket connection (via port) of the communication interface 40, and the application 2 (streaming application) may be communicating with the computer 102 over a different socket connection (via a port) of the communication interface 40, where the packets of traffic for each socket connection is monitored by the software component 135.

Figure 3:
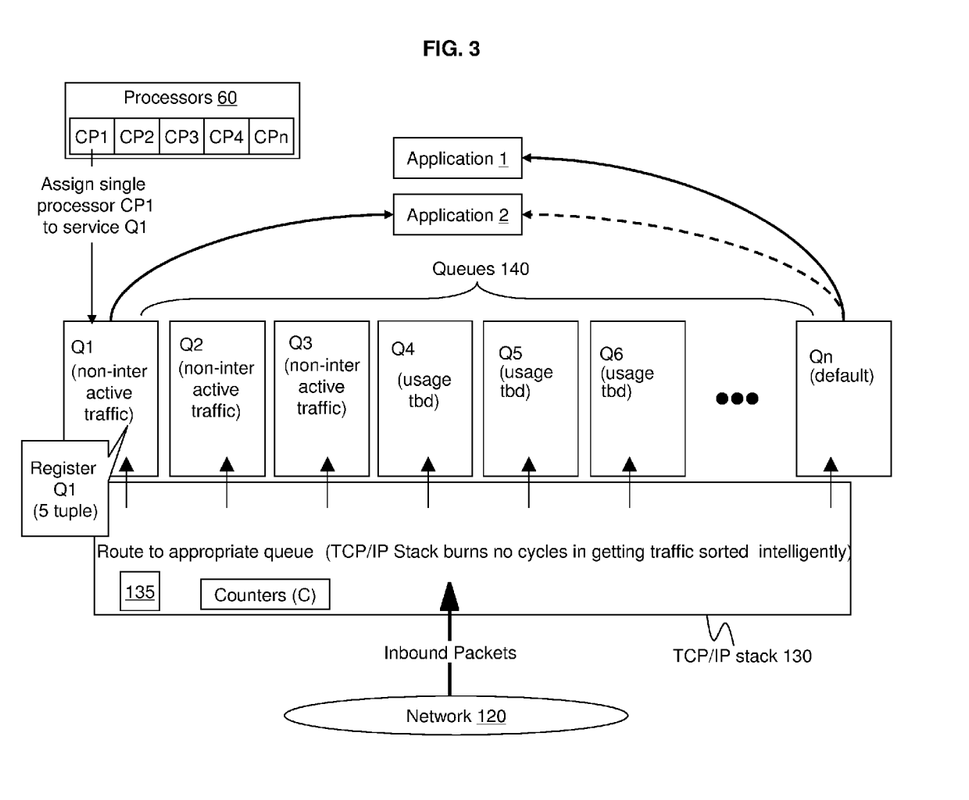
FIG. 3 illustrates a block diagram of transparent separation of interactive traffic in accordance with exemplary embodiments.

Now turning to FIG. 3, FIG. 3 is a block diagram of transparent separation of interactive traffic an example of exemplary embodiments. As mentioned herein, initially (only) Qn is being utilized because Qn is the default queue 140. In one implementation other queues 140 (such as Q1, Q2, etc.) may also be registered at initialization in advance of detecting non-interactive traffic. In another implementation, other queues 140 may be registered as the non-interactive traffic is detected by the software component 130. In a further implementation, some of the other queues 140 may be registered at initialization while the remainder of the other queues 140 may be registered as the non-interactive traffic is being detected. When inbound traffic (which has not yet been determined to be interactive and/or non-interactive packets) is received on the TCP/IP stack 130, the software module 135 moves the all the inbound packets to the (same) default Qn which has a timer (T) with a short interrupt time.

Assume that interactive traffic is initially being (received on the communication interface 40 and) placed on the default Qn, and the interactive traffic is from the computer 101 for the application 1. For example, the application 1 (OLTP application) may be communicating via its socket connection to computer 101 and the received packets of interactive traffic on the Qn are requests that require immediate response to the inbound packets received at the Qn. As a result, the interrupt timer (T) is short for the default Qn, such that the software component 135 quickly interrupts the application 1 when inbound interactive traffic (such as a request requiring a response) is received at the Qn, so that the application 1 can transmit a response back to the computer 101 that is waiting. When the computer 101 receives this response, the computer 101 can then continue transmitting further packets of the interactive traffic. For the interactive traffic transmitted and received between the application 1 and computer 101, this process of requests and responses continues for the interactive traffic being placed on the Qn, and consequently, this interactive traffic is adversely affected by delay in servicing the continuous streaming traffic pattern (of non-interactive traffic) associated with application 2.

Assume now that non-interactive traffic which is, e.g., bulk streaming data, starts to be received at the default Qn, and the non-interactive traffic is from the computer 102 and transmitted to the application 2 on a socket connection of the communication interface 40. Since the interrupt timer (T) is short for the Qn and since the (large) packets of the bulk streaming data are continuously being transmitted, the bulk streaming data of the non-interactive traffic blocks the interactive traffic on the Qn.

For example, when running over a conventional TCP/IP interface which needs to process latency sensitive (OLTP) interactive traffic, applying optimizations to the data stream can greatly reduce the network latency of the interactive traffic. The problem with this is when a bulk data streaming traffic flows on the same TCP/IP interface, the non-interactive bulk traffic is presented in order as it arrives on the TCP/IP interface. This causes latency sensitive OLTP interactive traffic to be placed behind the bulk data streaming traffic (in, e.g., the Qn), therefore delaying the processing of the OLTP traffic by the computer (e.g., delaying processing by the application 1 which may delay receiving further inbound interactive traffic from the computer 101).

In exemplary embodiments, to keep the TCP/IP stack 130 optimized for the interactive (OLTP) traffic on the default Qn, the bulk data streaming non-interactive traffic is detected (recognized) by the software component 135 and then moved to another (its own) inbound queue 140 which is Q1 so as not to interfere with the OLTP traffic on Qn. The movement (registering) to another inbound queue/service 140 is configured to occur (only) when the specific bulk data non-interactive traffic arrives on the socket connection, because the permanent allocation of this Q1 (or any other queue in addition to default Qn) would require the wasting of memory 15 resources. Further, once the software component 135 causes incoming non-interactive traffic to be separated from interactive traffic at the communication interface 40 (e.g., network adapter) by, e.g., registering the non-interactive socket connection to Q1, this separation provided by TCP/IP stack 130 (e.g., OSA) reduces the processor 60 usage by avoiding the processing required to perform the separation (i.e., the de-muxing or de-multiplexing) of the intermingled traffic from a single memory space (such as a buffer or queue). In conventional systems, the network adapter (e.g., communication interface) would place (store) the packets into the same buffer space. This then requires that the conventional system copy/move the intermingled packets (unpack) from one set of input buffers to another set of buffers to sort or place packets on to separate buffers. However, in exemplary embodiments, by the software component 135 causing the interactive traffic and non-interactive traffic to be separated at the communication interface 40 without having to be intermingled at a single buffer space of memory 15, the processor 60 savings with multiple input queues 140 (i.e., multiple memory 15 spaces) can be significant because processor's 60 requirement of storing/moving, de-multiplexing, and then copying the intermingled packets is eliminated.

With reference to FIG. 3, before the non-interactive traffic is detected by the software component 135, the dashed line from Qn to application 2 represents that application 2 is interfacing with the Qn for packets of the non-interactive traffic. Also, the dashed line shows that the application 2 is being interrupted by the software component 135 based on the short interrupt timer (T) of the Qn, although there is no request for the application 2 to provide responses back to the computer 102 because the computer 102 is transmitting bulk streaming non-interactive traffic. Non-interactive traffic means that the receiving application 2 is not required to interact, e.g., respond to any requests from the computer 102, in order for the computer 102 to continue sending packets of the non-interactive traffic. However, for the latency sensitize interactive traffic (e.g., of OLTP traffic), the computer 101 is waiting for an immediate response from the application 1 before the computer 101 can transmit its next packet(s) of the (latency sensitive) interactive traffic, and the packets of the interactive traffic are blocked by the (earlier) bulk packets of the non-interactive traffic in they are on the same Qn.

At the same time the non-interactive traffic is flowing on the TCP/IP stack 130, the software component 135 is configured to detect the non-interactive traffic based on a high bias of inbound packets to the application 2 from the computer 102 as compared to outbound packets transmitted from the application 2 to the computer 102. As one implementation according to exemplary embodiments, upon the 150th packet (received on this socket connection from the computer 102 to the application 2), the software component 135 is configured to monitor inbound and outbound data packet counts, and if biased at (least) 32:1 in either direction, the software component 135 is configured to infer that the traffic is non-interactive traffic for the (streaming) application 2. Although one implementation may utilize a ratio of 32:1 to detect the non-interactive traffic, it is understood that exemplary embodiments are not limited to this ratio and other ratios may be utilized. For example, the software components 135 can be configured to utilize a lower ratio of inbound to outbound (inbound:outbound) packets and/or a higher ratio of inbound to outbound packets, as would be understood by one skilled in view of the disclosure. Furthermore, the software component 135 is configured to detect the non-interactive traffic as early in the flow of non-interactive packets, so that the software component 135 can register the Q1 for the detected non-interactive traffic, thus allowing the interactive traffic to (solely) remain on the default Qn without being blocked/delayed.

Once the software component 135 of the TCP/IP stack 130 detects that the non-interactive traffic is being received on the TCP/IP 130 and placed on the default Qn, the software component 135 registers the 5 tuples and creates Q1 for the detected non-interactive traffic such that the detected non-interactive traffic is placed on Q1 instead of Qn. The solid line from Q1 to application 2 represents that the socket connection for the application 2 is registered to Q1, and that Q1 can interrupt application 2 based on the timer (T) of Q1. Also, during registration, the timer (T) for the Q1 is set to have a long interrupt time such that the application 2 is not continuously interrupted by the software component 135.

Further, the software component 135 is configured to prevent out of order delivery of the packets of the non-interactive traffic to the Q1. For example, to ensure in-order delivery of packets for the non-interactive traffic, the software components 135 is configured to assign, e.g., computer processor 1 (CP1) of the processors 60 to service the incoming non-interactive packets to Q1, such that no computer processor 60 races are possible among CP1-CPn, thereby eliminating multiprocessor induced ordering problems. The result is improved processor 60 (CPU) consumption for streaming workloads, and in many cases, much higher streaming throughput. In one implementation of exemplary embodiments, when the TCP/IP stack 130 informs the software module 135 that it is falling behind in placing in placing non-interactive packets on the Q1 (and packet loss is imminent for the non-interactive traffic designated for Q1), the software component 135 is configured to assign a second computer processor, e.g., CP2 to process packets to be placed in Q1 along with the CP1. Further, in an implementation of exemplary embodiments, if the software component 135 determines that the workload on Q1 is excessive, subsequent non-interactive (steaming) socket connections can be placed on, e.g., Q2, and then Q3. That is, the software component 135 is configured to dynamically register Q2 and Q3 as needed for any subsequent non-interactive socket connections. Additionally, the software component 135 is configured to assign Q2 its own processor 60 such, e.g., CP3 and assign Q3 its own processor 60 such as, e.g., CP4.

Figure 4:
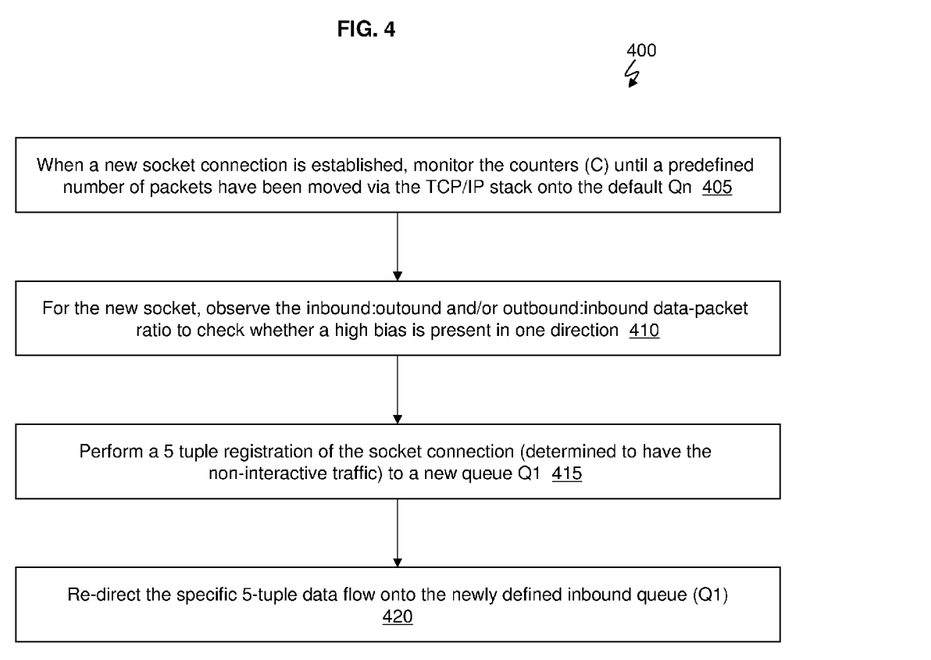
FIG. 4 illustrates a flow chart in accordance with exemplary embodiments.

FIG. 4 illustrates a flow chart 400 for implementing transparent traffic separation according to exemplary embodiments. The following scenario is provided for illustrative purposes but is not meant to be limiting. When the communication interface 40 (e.g., NIC) is first established to the TCP/IP stack 130 (and/or the operating system), there will be (e.g., only) a single inbound queue (Qn) and a single process thread (CPn) scheduled to consume the inbound traffic. At this time, all inbound traffic is assumed to be interactive (e.g., by the software component 135 of the TCP/IP stack 130) and therefore latency sensitive. The software component 135 is configured to separate the non-interactive traffic from the interactive (latency sensitive) traffic. Since there is nothing in an individual packet that tells if the specific packet is for a streaming the traffic patterns, e.g., at the transport layer (TCP/User Datagram Protocol (UDP)) may be analyzed by the software component 135. A streaming socket connection can be identified by the software module 135 as a socket connection which shows a high bias towards data flowing in a single direction. As data begins to flow on the inbound queue (Qn), new counters (C) are added inside the TCP/IP stack 130 to count the number of inbound and outbound data-carrying (non-control) packets (segments) on a per connection basis.

Now with reference to the flow chart 400, in one implementation of exemplary embodiments, the software component 135 is configured to, when a new socket connection is established, monitor the counters (C) until a predefined number of (e.g., 150) packets have been moved via the TCP/IP stack 130 onto the Qn at operation 405. The predefined number of packets for a normal 1500 byte maximum transmission unit (MTU) would be approximately 21 Kbytes of data.

At operation 410, the software component 135 is configured to observe the inbound:outbound and/or outbound:inbound data-packet ratio to check whether a high bias is present in one direction. For example, if either ratio is (at least) a predefined (such as, e.g., 32:1) and/or adjustable ratio, the software component 135 is configured to determine that the packets over the socket connection are a streaming connection. The software component 135 is configured to infer that this is a streaming flow regardless if the streaming flow is either inbound and/or outbound.

Figure 2:
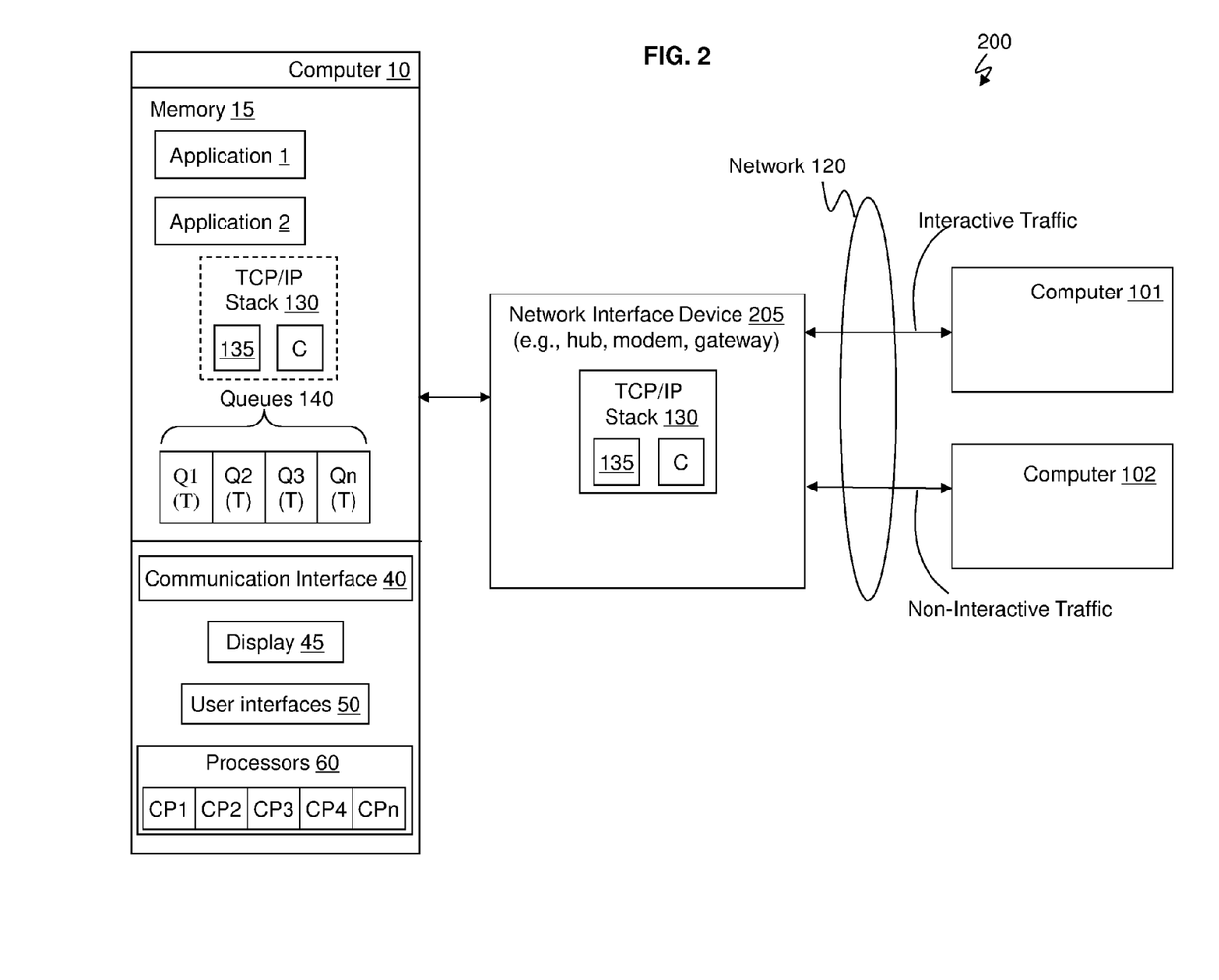
FIG. 2 illustrates a block diagram of another implementation in accordance with exemplary embodiments.

At operation 415, the software component 135 is configured to perform a 5 tuple (e.g., source IP address, destination IP address, source port number, destination port number, and/or protocol (TCP/UDP)) registration of the socket connection (determined to have the non-interactive traffic) to a new queue Q1. The software component 135 is configured to register (and subsequently deregister) the queue Q1 with the communication interface 40. In FIG. 2 which is discussed further below, the software component 135 may register and deregister the queue Q1 with a network interface device 205. Based on the registration of Q1 from the software component 135 of the TCP/IP stack 130, the communication interface 40 (and/or the network interface device 205) is configured to perform the parsing of the inbound packets to locate the non-interactive packets and is configured to perform the queue routing function to place the non-interactive packets on the registered queue Q1.

At operation 420, the software module 135 is configured to re-direct the specific 5-tuple data flow onto the newly defined inbound queue Q1. This inbound queue is setup to handle any streaming applications, so any subsequent 5-tuple traffic would also be directed to this new queue Q1. Note that if the number of 5-tuple socket connections reached a predefined threshold on the inbound queue Q1, multiple streaming queues can be defined by the software component 135, such as Q2, Q3, Q4, etc.

Also note that the software component 135 is configured to place both inbound and outbound packets for the (non-interactive) streaming connection on the new queue Q1. As such, regardless of direction, there is value in keeping all of the bulk non-interactive traffic on a single CP such as CP1, and by keeping the traffic on the single CP1, exemplary embodiments are designed to avoid out of order delivery and/or transmission problems (which has constantly been an issue).

Further, in one implementation of exemplary embodiments, after every 3000 packets have flowed on the socket connection (which has been determined to be non-interactive traffic), the inbound:outbound and/or outbound:inbound data-packet ratio is again checked by the software component 135. If the socket connection now looks more interactive (e.g., the ratio has dropped below 32:1 in either direction), the 5-tuple is deregistered by the software component 135 for the Q1, and the socket connection is moved back to the interactive queue Qn. This enables the connection to transition between interactive and non-interactive (streaming) dynamically based on the traffic pattern for the specific socket connection.

With reference to FIG. 1, FIG. 1 also illustrates a dashed box 135 in the communication interface 40. This represents that (part or all of) the software component 135 may be alternatively and/or additionally implemented in the communication interface 40. One skilled in the art understands that the logic of the software application may also be implemented as hardware, e.g., such as by circuitry including logic gates.

Now turning to FIG. 2, FIG. 2 illustrates a block diagram 200 of a further implementation in accordance with exemplary embodiments. The computers 10, 101, and 102 may be identical to those in block diagram 100. Block diagram 200 now includes the network interface device 205 between the computer 10 and the network 120. The network interface device 205 may be customer premises equipment and/or enterprise equipment of, e.g., an Internet service provider. The network interface device 205 may represent a modem, hub, gateway, router, and/or any device for facilitating communications via the network 120. Alternatively and/or additionally, the network interface device 205 may include (part or all of) the software component 135 and/or the TCP/IP stack 130 configured to operate as discussed herein according to exemplary embodiments.

Figure 5:
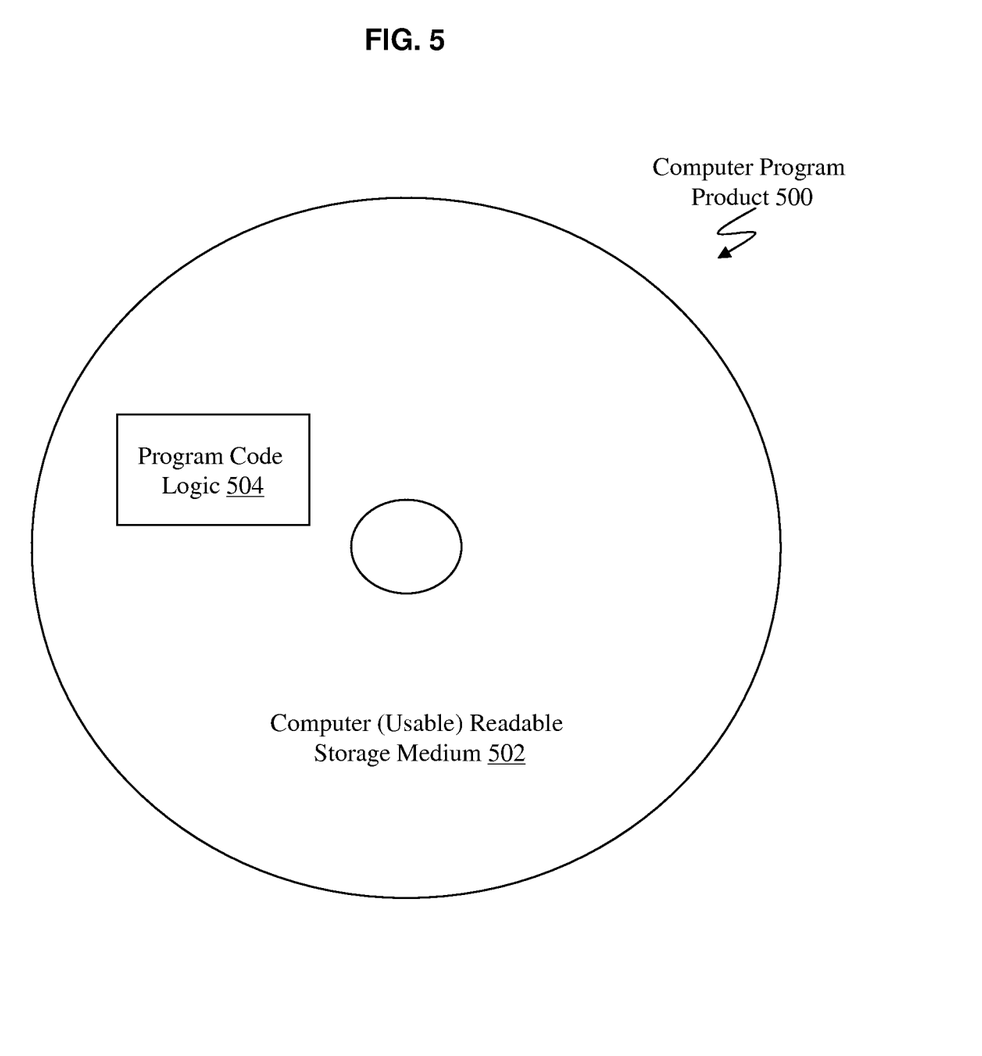
FIG. 5 illustrates a computer program product on a computer readable storage medium in accordance with exemplary embodiments.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

Figure 6:
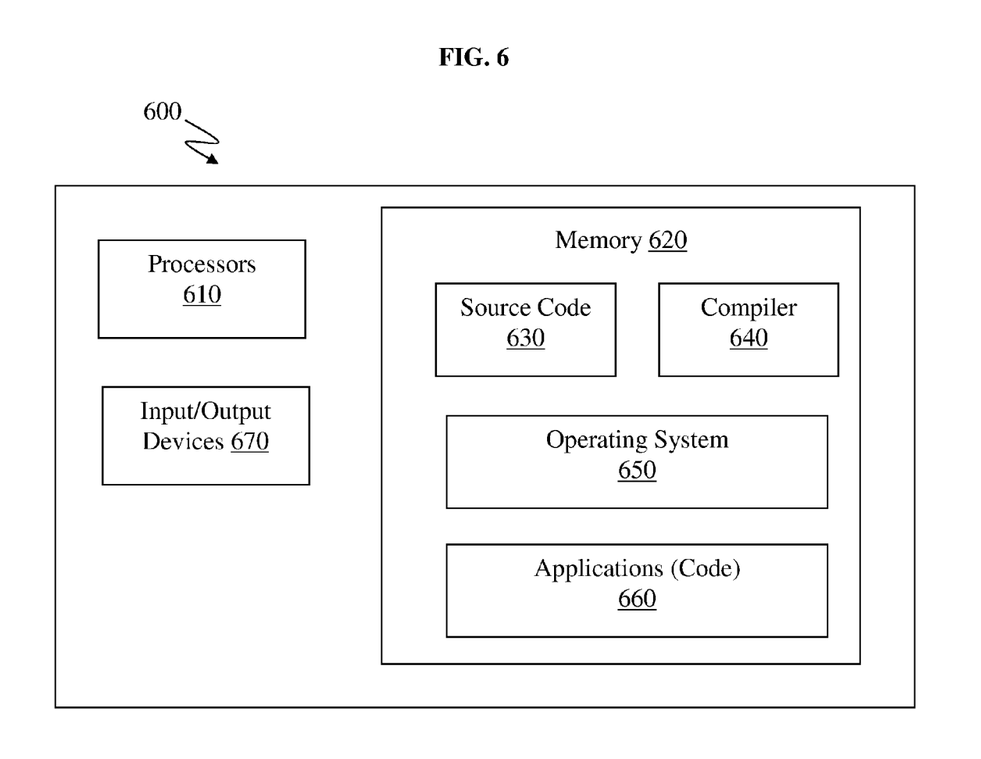
FIG. 6 illustrates an example of a computer having capabilities, which may be included in exemplary embodiments.

FIG. 6 illustrates an example of a computer 600 having capabilities, which may be included in exemplary embodiments. Various methods, procedures, modules, flow diagrams, tools, application, and techniques discussed herein may also incorporate and/or utilize the capabilities of the computer 600. Moreover, capabilities of the computer 600 may be utilized to implement features of exemplary embodiments discussed herein. One or more of the capabilities of the computer 600 may implement any element discussed herein such as but not limited to the computer 10, the computer 101, the computer 102, the network interface device 205, etc.

Generally, in terms of hardware architecture, the computer 600 may include one or more processors 610, computer readable storage memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, controllers, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 620 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A device, comprising:
   a communication interface configured to transmit and receive traffic over a network; and
   a stack configured to dynamically identify the traffic as interactive traffic and non-interactive traffic;
   wherein when the stack identifies the non-interactive traffic, the stack is configured to move the non-interactive traffic to a non-interactive queue;
   wherein as the non-interactive traffic and the interactive traffic are being received at the communication interface, the stack is configured to initially place the non-interactive traffic and the interactive traffic in a same default queue;
   wherein the stack is configured to determine that the non-interactive traffic is to be placed in the non-interactive queue after monitoring a predetermined amount of packets of the non-interactive traffic; and
   wherein the non-interactive queue is interrupted less frequently than the default queue.

2. The device of claim 1, wherein the stack is configured to monitor a flow of the traffic by the communication interface to identify the interactive traffic and the non-interactive traffic.

3. The device of claim 1, wherein the stack is configured to monitor inbound packets and outbound packets to identify a part of the traffic as the non-interactive traffic.

4. The device of claim 1, wherein to identify the non-interactive traffic, the stack is configured to determine a high bias in inbound packets or outbound packets of the non-interactive traffic.

5. The device of claim 1, wherein when the non-interactive traffic is identified by the stack, the stack is configured to register the non-interactive queue.

6. The device of claim 5, wherein when the stack determines that the non-interactive traffic is no longer flowing, the stack is configured to deregister the non-interactive queue.

7. The device of claim 1, wherein the stack is configured to assign a single processor to place the non-interactive traffic on the non-interactive queue.

8. The device of claim 1, wherein the non-interactive traffic is determined to be streaming traffic; and
   wherein the stack is configured to determine the streaming traffic based on a high bias of the streaming traffic flowing in one direction as compared to the opposite direction.

9. A method for transparent separation of traffic, comprising:
   transmitting and receiving the traffic over a network;
   dynamically identifying the traffic as interactive traffic and non-interactive traffic;
   when the non-interactive traffic is identified, moving the non-interactive traffic to a unique queue;
   as the non-interactive traffic and the interactive traffic are being received, initially placing the non-interactive traffic and the interactive traffic in a same default queue; and determining that the non-interactive traffic is to be placed in the unique queue after monitoring a predetermined amount of packets of the non-interactive traffic;

wherein the unique queue is interrupted less frequently than the default queue.

10. The method of claim 9, further comprising when the non-interactive traffic is identified, registering the unique queue.

11. The method of claim 10, further comprising when it is determined that the non-interactive traffic is no longer flowing, deregistering the unique queue.

12. The method of claim 9, further comprising assigning a single processor to place the non-interactive traffic on the unique queue.

13. The method of claim 9, further comprising monitoring a flow of the traffic to identify the interactive traffic and the non-interactive traffic.

14. The method of claim 9, monitoring inbound packets and outbound packets to identify a part of the traffic as the non-interactive traffic.

15. The method of claim 9, further comprising to identify the non-interactive traffic, determining a high bias in inbound packets or outbound packets of the non-interactive traffic.

16. The method of claim 9, further comprising eliminating an intermingling of packets of the traffic in a single buffer space; and reducing processor usage by eliminating a moving of the intermingled packets into the single buffer space, by eliminating de-multiplexing of the intermingled packets in the single buffer space, and by eliminating a copying of the intermingled packets out of the single buffer space into respective buffer spaces.

17. A computer program product for transparent separation of traffic, the computer program product comprising:

a non-transitory computer readable storage medium having computer readable program code embodied therewith, the computer readable program code for transparent separation of traffic comprising:

transmitting and receiving the traffic over a network;

dynamically identifying the traffic as interactive traffic and non-interactive traffic;

when the non-interactive traffic is identified, moving the non-interactive traffic to a unique queue;

as the non-interactive traffic and the interactive traffic are being received, initially placing the non-interactive traffic and the interactive traffic in a same default queue; and determining that the non-interactive traffic is to be placed in the unique queue after monitoring a predetermined amount of packets of the non-interactive traffic;

wherein the unique queue is interrupted, less frequently than the default queue.

* * * * *